(12) United States Patent
Nagura et al.

(10) Patent No.: US 6,648,085 B2
(45) Date of Patent: Nov. 18, 2003

(54) FUEL-CELL-POWERED FOUR-WHEEL AUTOMOBILE

(75) Inventors: Hidenori Nagura, Saitama (JP); Nobuaki Komuro, Saitama (JP); Noboru Yamashita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,769

(22) Filed: Nov. 20, 2001

(65) Prior Publication Data

US 2002/0060100 A1 May 23, 2002

(30) Foreign Application Priority Data

Nov. 20, 2000 (JP) ......................................... 2000-352980

(51) Int. Cl.⁷ ............................... B60K 1/04; B60R 16/04
(52) U.S. Cl. ..................................... 180/65.1; 180/68.5
(58) Field of Search ............................. 180/65.1, 65.3, 180/68.5, 69.4

(56) References Cited

U.S. PATENT DOCUMENTS

| | | | | |
|---|---|---|---|---|
| 4,339,015 A | * | 7/1982 | Fowkes et al. | 180/68.5 |
| 4,365,681 A | * | 12/1982 | Singh | 180/68.5 |
| 5,390,754 A | * | 2/1995 | Masuyama et al. | 180/68.5 |
| 5,392,873 A | * | 2/1995 | Masuyama et al. | 180/68.5 |
| 5,501,289 A | * | 3/1996 | Nishikawa et al. | 180/68.5 |
| 5,620,057 A | * | 4/1997 | Klemen et al. | 180/68.5 |
| 5,641,031 A | * | 6/1997 | Riemer et al. | 180/65.3 |
| 5,667,907 A | * | 9/1997 | Audit et al. | 180/65.1 |
| 5,918,692 A | * | 7/1999 | Sekita et al. | 180/65.1 |
| 6,220,380 B1 | * | 4/2001 | Mita et al. | 180/65.1 |
| 6,378,637 B1 | * | 4/2002 | Ono et al. | 180/65.3 |

FOREIGN PATENT DOCUMENTS

JP         A 3-109126        5/1991

* cited by examiner

Primary Examiner—Brian L. Johnson
Assistant Examiner—Jeffrey Restifo
(74) Attorney, Agent, or Firm—Birch, Stewart, Kolasch & Birch, LLP

(57) ABSTRACT

A tank is disposed beneath a floor for storing methanol and water. A reforming unit is disposed beneath the floor for generating hydrogen from methanol and water supplied from the tank. A fuel cell is disposed beneath the floor for generating electricity from an electrochemical reaction of hydrogen generated by the reforming unit and oxygen in air. A secondary battery is disposed beneath the floor for storing electricity generated by the fuel cell. In this way, mechanisms for generating electricity from air, methanol, and water are centralized.

17 Claims, 7 Drawing Sheets

FUEL-CELL-POWERED FOUR-WHEEL AUTOMOBILE

This nonprovisional application claims priority under 35 U.S.C. §119(a) on Patent Application No. 2000-352980 filed in Japan on Nov. 20, 2000, which is herein incorporated by reference.

BACKGROUND OF THE INVENTION

1. Field of the Invention

The present invention relates to a fuel-cell-powered four-wheel automobile having a chassis with a rectangular shape as viewed in plan with four wheels positioned at respective four corners thereof, a riding seat disposed substantially centrally on the chassis, a flat floor mounted on the chassis in front of the riding seat, and an electric motor for moving the four-wheel automobile.

2. Description of the Background Art

One fuel-cell-powered four-wheel automobile is known from Japanese patent Laid-open No. Hei 3-109126 entitled "Fuel-cell electric automobile". According to FIG. 1 of the above publication, the disclosed arrangement is an electric automobile having a fuel cell 13 (the reference numeral is from the publication) as an energy source, which is disposed below a central region of a chassis 2.

To use the fuel cell 13, there are required a fuel tank for storing methanol, a reforming unit for generating hydrogen, and a secondary battery for storing generated electricity, in addition to the fuel cell 13, as described later on. The layout of the fuel cell 13, the reforming unit, and the secondary battery is an important concern in installing them on a four-wheel automobile. One example of a fuel cell system based on the principles of electric power generation by a fuel cell will be described below.

FIGS. 6A and 6B are views illustrative of the principles of electric power generation by a fuel cell. FIG. 6A shows the principles of an electrolysis of water, and FIG. 6B shows the principles of electric power generation by a fuel cell.

In FIG. 6A, water ($H_2O$) with an electrolyte such as sulfuric acid ($H_2SO_4$) dissolved therein is placed in a water tank 101, and electrodes 102, 103 of platinum or the like are put in the water tank 101. The electrodes 102, 103 are covered with respective cases 104, 105, and a D.C. power supply 106 is connected between the electrodes 102, 103. According to the well known principles of an electrolysis of water, an oxygen gas ($O_2$) is generated at the electrode 103 which serves as a negative electrode, and a hydrogen gas ($H_2$) is generated at the electrode 102 which serves as a positive electrode. The arrows ($e^-$) indicate a flow of charges, and the arrows ($H^+$) indicate a flow of hydrogen ions.

In FIG. 6B, which shows a process that is a reversal of the process shown in FIG. 6A, an oxygen gas ($O_2$) is placed in one case 104, and a hydrogen gas ($H_2$) is placed in the other case 105, and a load 107 is connected between the electrodes 102, 103. When the oxygen gas ($O_2$) and the hydrogen gas ($H_2$) are subjected to an electrochemical reaction in water ($H_2O$) with an electrolyte such as sulfuric acid ($H_2SO_4$) dissolved therein, a current flows through the load 107. The oxygen gas ($O_2$) and the hydrogen gas ($H_2$) are combined into water ($H_2O$).

The reversal of the electrolysis of water shown in FIG. 6A represents the principles of electric power generation by a fuel cell. A fuel cell system will be described below.

FIG. 7 is a block diagram showing a fuel cell system by way of example. A fuel cell system 110 comprises a fuel tank 111 for storing methanol, a reforming unit 112 for generating hydrogen from methanol and water, a fuel cell 113 for causing an electrochemical reaction of hydrogen generated by the reforming unit 112 and oxygen in air, a first pump 115 for delivering air in the atmosphere through an air cleaner 114 into the fuel cell 113, a second pump 116 for delivering hydrogen from the reforming unit 112 into the fuel cell 113, a catalyzer (catalyst) 117 for receiving a water vapor discharged from the fuel cell 113 and a carbon dioxide gas produced by the reforming unit 112 and fed through the fuel cell 113 and reducing the amount of the carbon dioxide gas, a water tank 118 for receiving water discharged from the catalyzer 117, a secondary battery 119 for storing electricity generated by the fuel cell 113, and a motor 122 connected to the secondary battery 119 through a controller 121. The secondary battery 119 also stores electricity generated by the motor 122.

In FIG. 7, the blank arrow ($CH_3OH$) represents a flow of methanol, the blank arrow ($H_2$) a flow of hydrogen gas, the blank arrow ($O_2$) a flow of oxygen gas, the blank arrow ($H_2O+CO_2$) a flow of water vapor and carbon dioxide gas, and the blank arrow ($H_2O$) a flow of water.

As described above, to the fuel cell 113 as an energy source of a four-wheel automobile (not shown), the fuel tank 111 for storing methanol, the reforming unit 112 for generating hydrogen, and the secondary battery 119 for storing electricity generated by the fuel cell 113 are required. For installing the fuel tank 111, the reforming unit 112, and the fuel cell 113 on the four-wheel automobile, it is necessary to take into account weight balancing, maintenance services, design details or the like, and a variety of layout proposals need to be analyzed for the fuel cell system 110.

SUMMARY OF THE INVENTION

It is therefore an object of the present invention to provide a technology for optimally placing a fuel cell, a reforming unit, or a secondary battery in installing a fuel cell on a four-wheel automobile.

To achieve the above object, a fuel-cell-powered four-wheel automobile has a chassis which is of a rectangular shape as viewed in plan with four wheels positioned at respective four corners thereof, a riding seat disposed substantially centrally on the chassis, a flat floor mounted on the chassis in front of the riding seat, and an electric motor for moving the four-wheel automobile. A tank is disposed beneath the floor for storing methanol and water. A reforming unit is disposed beneath the floor for generating hydrogen from methanol and water supplied from the tank. A fuel cell is disposed beneath the floor for generating electricity from an electrochemical reaction of hydrogen generated by the reforming unit and oxygen in air. Finally, a secondary battery is disposed beneath the floor for storing electricity generated by the fuel cell.

Methanol and water are supplied from the tank to the reforming unit, which generates hydrogen from the methanol and the water. The generated hydrogen is supplied to the fuel cell, which generates electricity. The generated electricity is supplied to the electric motor to rotate the electric motor, thus moving the four-wheel automobile.

Since the tank, the reforming unit, the fuel cell, and the secondary battery are disposed beneath the floor, mechanisms for generating electricity from air, methanol, and water are centralized. As a result, a function to generate electricity from air, methanol, and water can be accommodated in one unit, and the components including the tank, the reforming unit, the fuel cell, and the secondary battery can be made compact.

The fuel-cell-powered four-wheel automobile is characterized in that the fuel cell and the electric motor are disposed respectively on the left and right sides or the right and left sides of a central line which divides the chassis into left and right portions.

It is important to keep the weight of the chassis of the four-wheel automobile in balance. The weight of the chassis is kept in good balance by positioning the fuel cell and the electric motor respectively on the left and right sides or the right and left sides of the central line which divides the chassis into the left and right portions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

An embodiment of the present invention will be described below with reference to the accompanying drawings. The terms "front", "rear", "left", "right", "upper", and "lower" are used to refer to the directions as viewed from the worker, and "Fr" represents front, "Rr" represents rear, "L" represents left, and "R" represents right.

Figure 1:
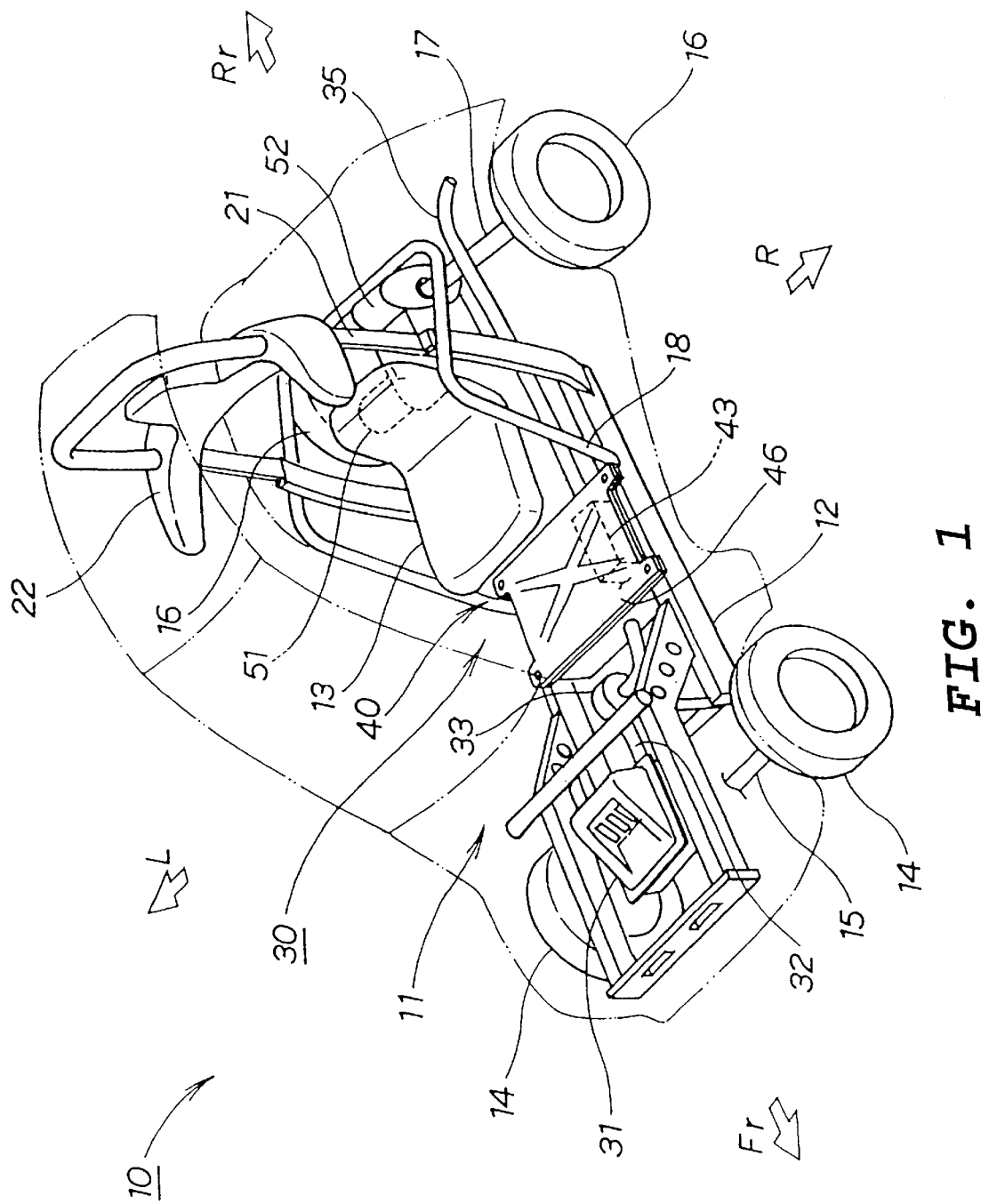
FIG. 1 is a perspective view of a fuel-cell-powered four-wheel automobile according to the present invention.

FIG. 1 is a perspective view of a fuel-cell-powered four-wheel automobile according to the present invention. A fuel-cell-powered four-wheel automobile 10 includes a chassis 11, a chassis frame 12, a riding seat 13, two front wheels 14, a front axle 15, two rear wheels 16, a rear axle 17, a protective frame 18 surrounding the seat 13, a back frame 21, a pillow 22 mounted on the back frame 21, a power system 30, an air cleaner 31, an intake pipe 32, an air pump 33, an exhaust pipe 35, a fuel cell unit 40, a fuel cell 43, a floor 46, an electric motor 51, and a transmission 52.

The fuel-cell-powered four-wheel automobile 10 is in the form of a buggy with the fuel cell 43 mounted thereon, and classified as an ATV (All Terrain Vehicle). Since the fuel-cell-powered four-wheel automobile 10 has a lightweight and compact chassis design, can makes small turns, and can easily be maneuvered, it is used as an off-road-only vehicle for moving people in agricultural use, cattle-breeding use, hunting use, safety supervising operations, and leisure use.

Figure 2:
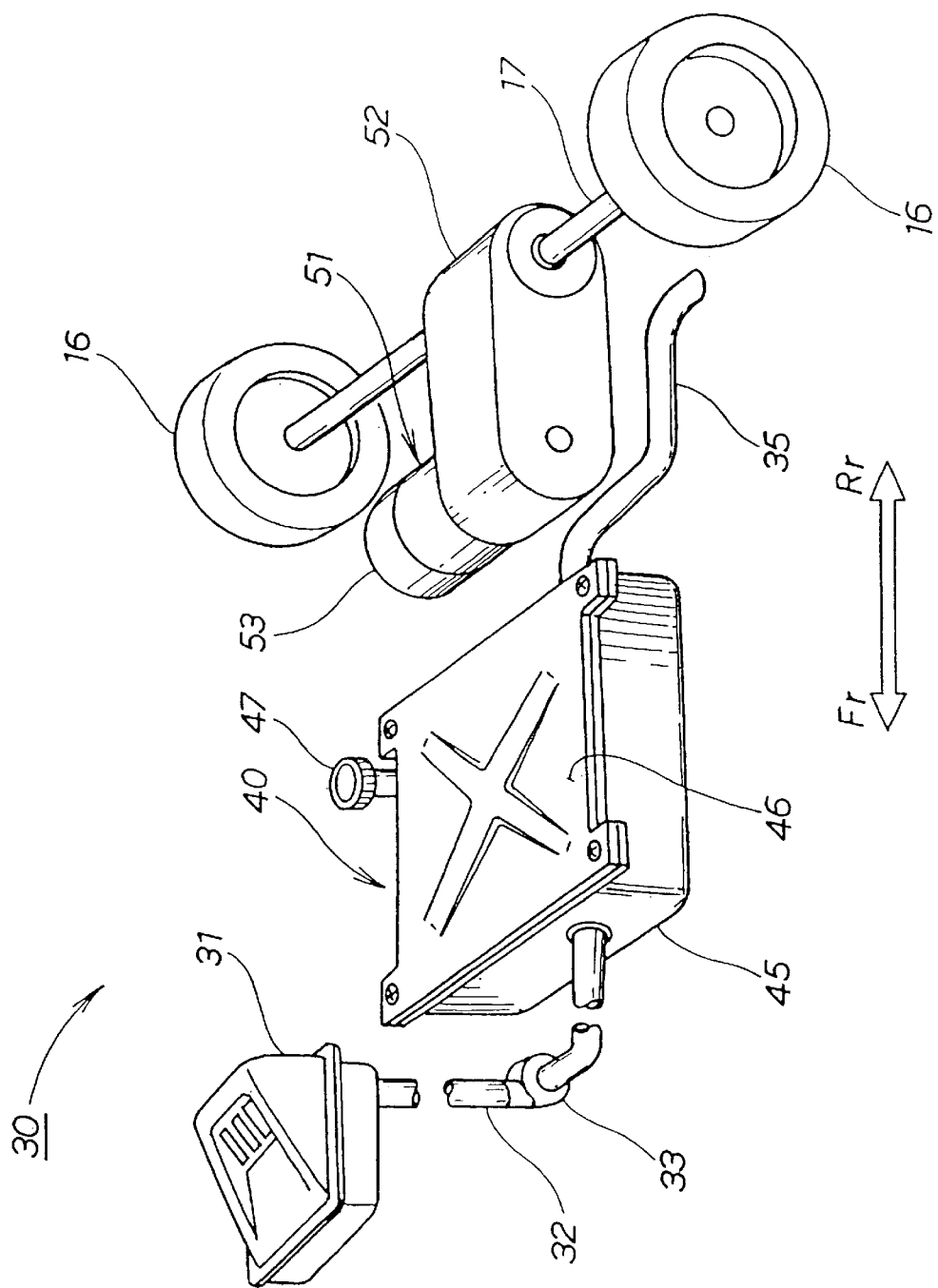
FIG. 2 is an exploded perspective view of the power system of the fuel-cell-powered four-wheel automobile according to the present invention.

FIG. 2 is an exploded perspective view of the power system of the fuel-cell-powered four-wheel automobile according to the present invention. The power system 30 includes the air cleaner 31 for purifying air, the intake pipe 32 for guiding air purified by the air cleaner 31, the air pump 33 connected to the intake pipe 32 for delivering air, the fuel cell unit 40 for generating electricity from elements, one of which is air supplied by the air pump 33, the exhaust pipe 35 for discharging exhaust gases generated by the fuel cell unit 40, the electric motor 51 which is energizable by electricity generated by the fuel cell unit 40, the transmission 52 coupled to the electric motor 51, and a controller 53 for controlling the electric motor 51 and the transmission 52.

Figure 3:
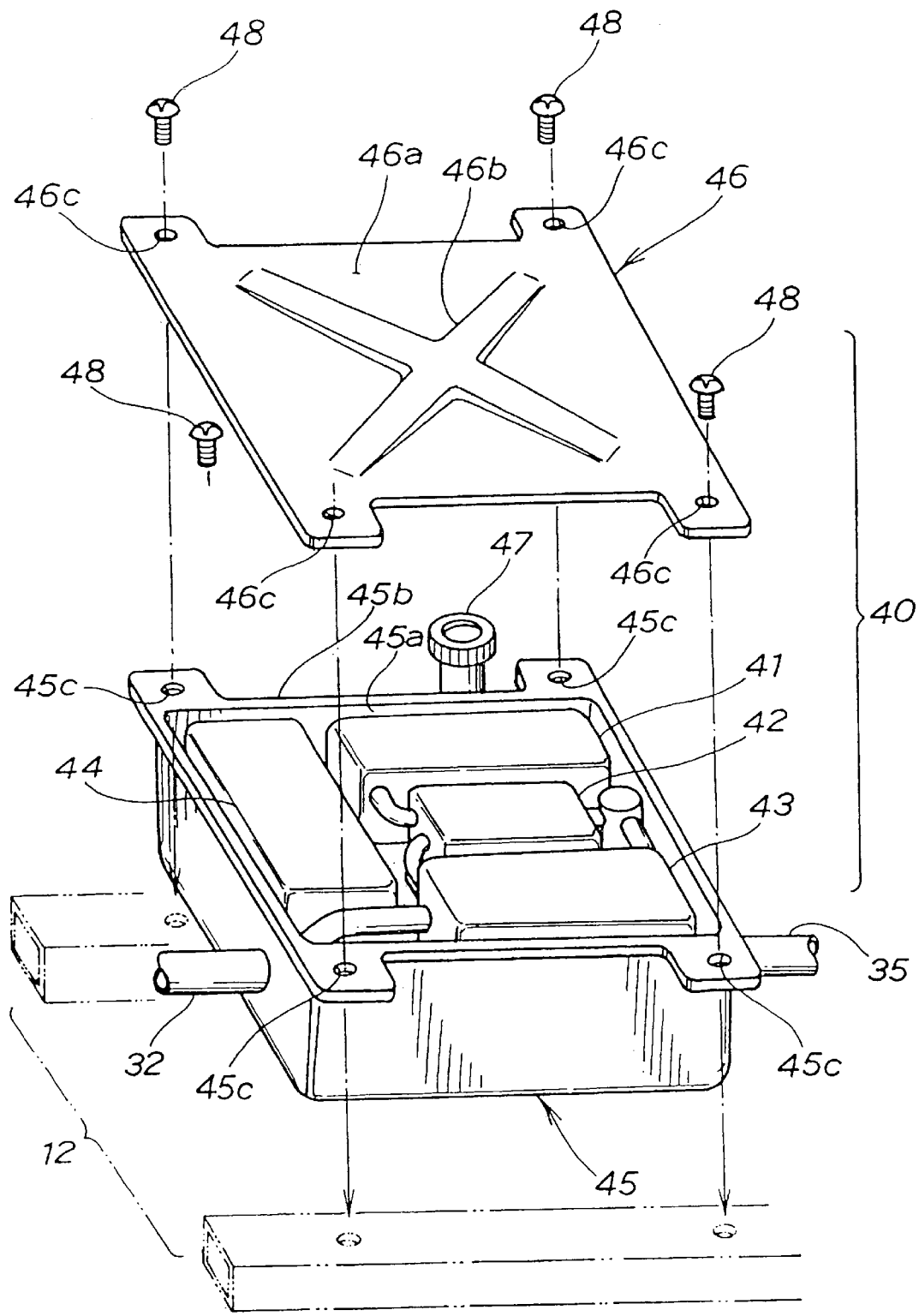
FIG. 3 is a perspective view of the fuel cell unit of the fuel-cell-powered four-wheel automobile according to the present invention.

FIG. 3 is a perspective view of the fuel cell unit of the fuel-cell-powered four-wheel automobile according to the present invention. The fuel cell unit 40 includes a tank 41 for storing methanol and water, a reforming unit 42 for generating hydrogen from methanol and water supplied from the tank 41, the fuel cell 43 for causing an electrochemical reaction of hydrogen generated by the reforming unit 42 and oxygen in air, a secondary battery 44 for storing electricity generated by the fuel cell 43, a case 45 housing the tank 41, the reforming unit 42, the fuel cell 43, and the secondary battery 44, and the floor 46 also serving as a cover placed over the case 45. A cap 47 is attached to the tank.

The case 45 comprises a storage casing 45a housing the tank 41, the reforming unit 42, the fuel cell 43, and the secondary battery 44, a flange 45b bent from the storage casing 45a, and a plurality of attachment holes 45c defined in the flange 45b. The floor 46 has a main panel 46a with stiffener ribs 46b formed thereon and a plurality of attachment holes 46c defined in the main panel 46a. Screws 48 extend through the attachment holes 45c of the case 45 and the attachment holes 46c of the floor 46 to attach the case 45 and the floor 46 integrally to the chassis frame 12.

The fuel cell unit 40 is a unit which accommodates the tank 41, the reforming unit 42, the fuel cell 43, and the secondary battery 44, and allows them to be easily mounted on the chassis 11 (see FIG. 1). Operation of the fuel-cell-powered four-wheel automobile 10 described above will be described below.

Figure 4:
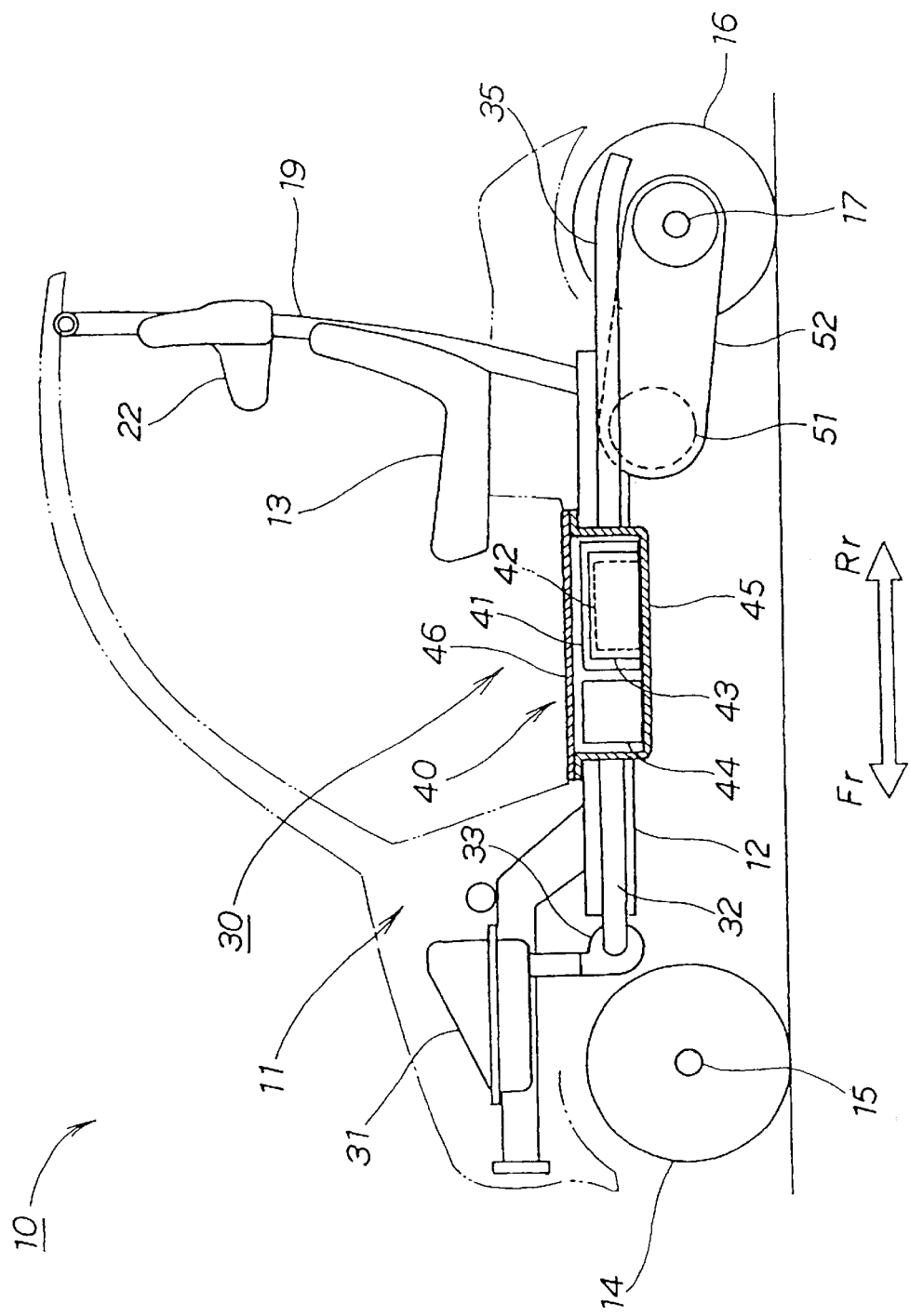
FIG. 4 is a view illustrative of a first mode of operation of the fuel-cell-powered four-wheel automobile according to the present invention.

FIG. 4 is a view illustrative of a first mode of operation of the fuel-cell-powered four-wheel automobile according to the present invention. The fuel-cell-powered four-wheel automobile 10 has the chassis 11 which is of a rectangular shape as viewed in plan with the four wheels, i.e., the front wheels 14 and the rear wheels 16, positioned at respective four corners thereof, the riding seat 13 disposed substantially centrally on the chassis 11, the flat floor 46 mounted on the chassis 11 in front of the riding seat 13, and the electric motor 51 for moving the four-wheel automobile. The tank 41 is disposed beneath the floor 46 for storing methanol and water. The reforming unit 42 is disposed beneath the floor 46 for generating hydrogen from methanol and water supplied from the tank 41. The fuel cell 43 is disposed beneath the floor 46 for generating electricity from an electrochemical reaction of hydrogen generated by the reforming unit 42 and oxygen in air. Finally, the secondary battery 44 is disposed beneath the floor 46 for storing electricity generated by the fuel cell 43.

The fuel-cell-powered four-wheel automobile 10 is propelled by supplying methanol and water from the tank 41 to the reforming unit 42, generating hydrogen from the methanol and the water with the reforming unit 42, supplying the hydrogen to the fuel cell 43, generating electricity with the fuel cell 43, and supplying the electricity to the electric motor 51 to rotate the electric motor 51.

Since the tank 41, the reforming unit 42, the fuel cell 43, and the secondary battery 44 are disposed beneath the floor 46, the center of gravity of the fuel-cell-powered four-wheel automobile 10 is lowered. Because the tank 41, the reforming unit 42, the fuel cell 43, and the secondary battery 44 are disposed beneath the floor 46, mechanisms for generating electricity from air, methanol, and water are centralized. As a result, a function to generate electricity from air, methanol, and water can be accommodated in one unit, and the components including the tank 41, the reforming unit 42, the fuel cell 43, and the secondary battery 44 can be made compact.

Figure 5:
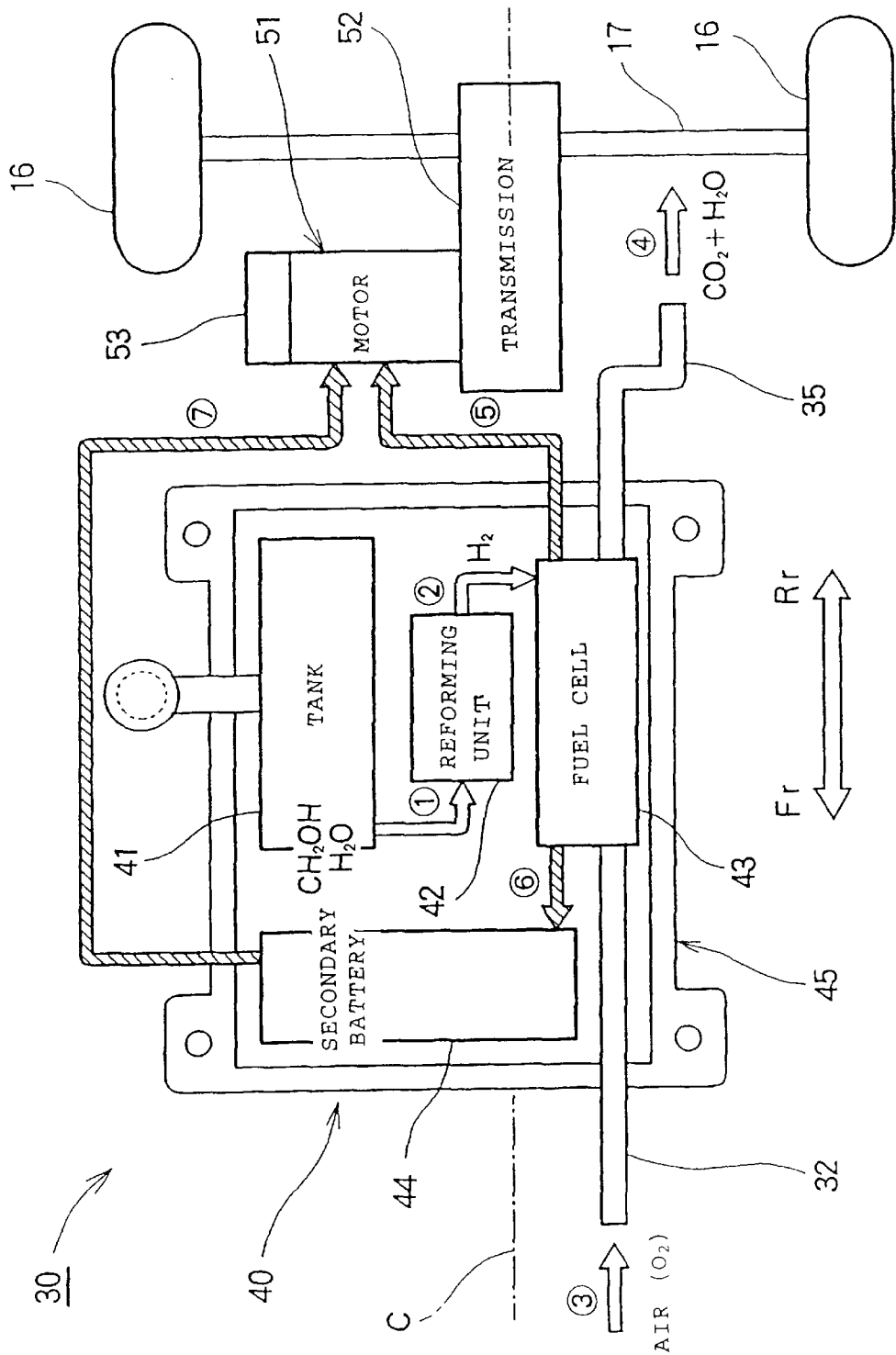
FIG. 5 is a view illustrative of a second mode of operation of the fuel-cell-powered four-wheel automobile according to the present invention.
Figure 6A:
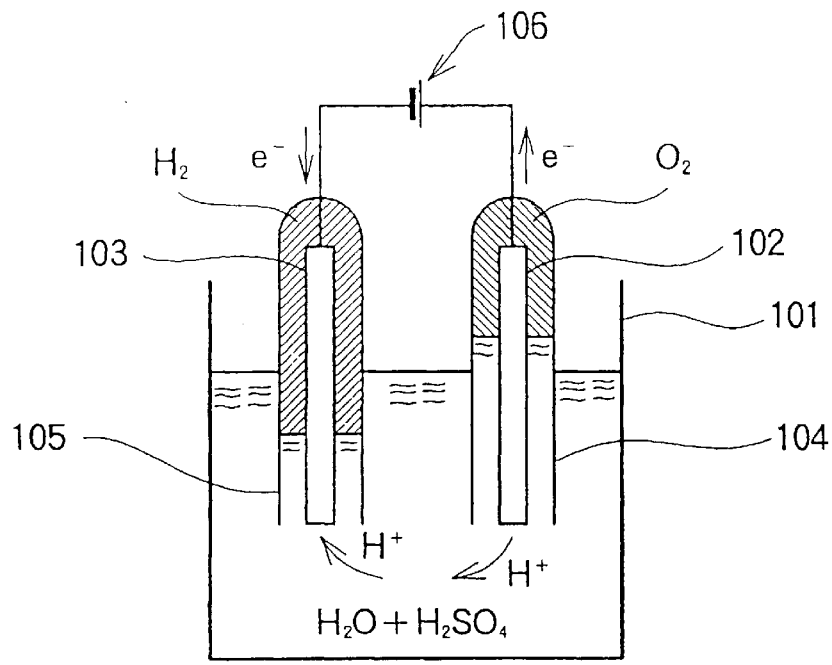
FIGS. 6A and 6B are views illustrative of the principles of electric power generation by a fuel cell.
Figure 6B:
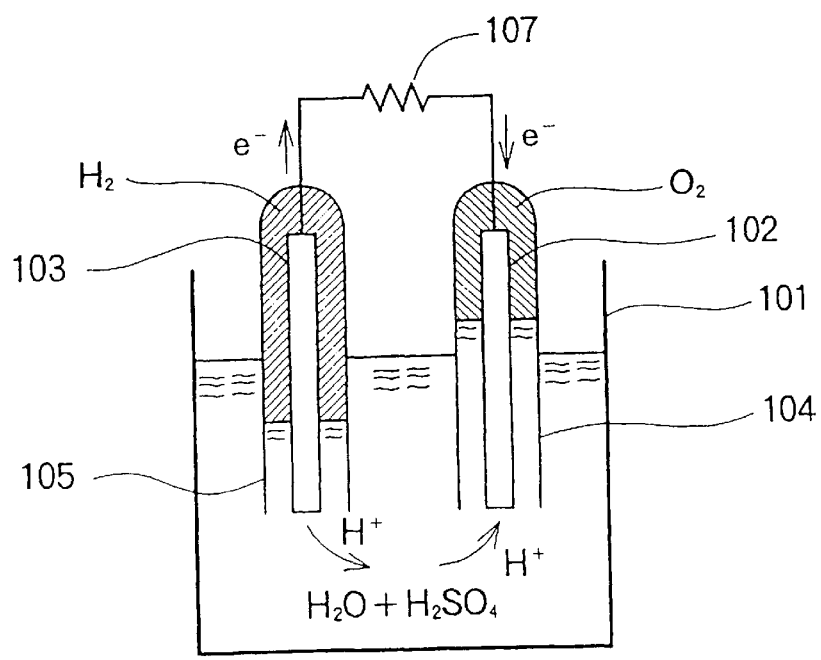
Figure 7:
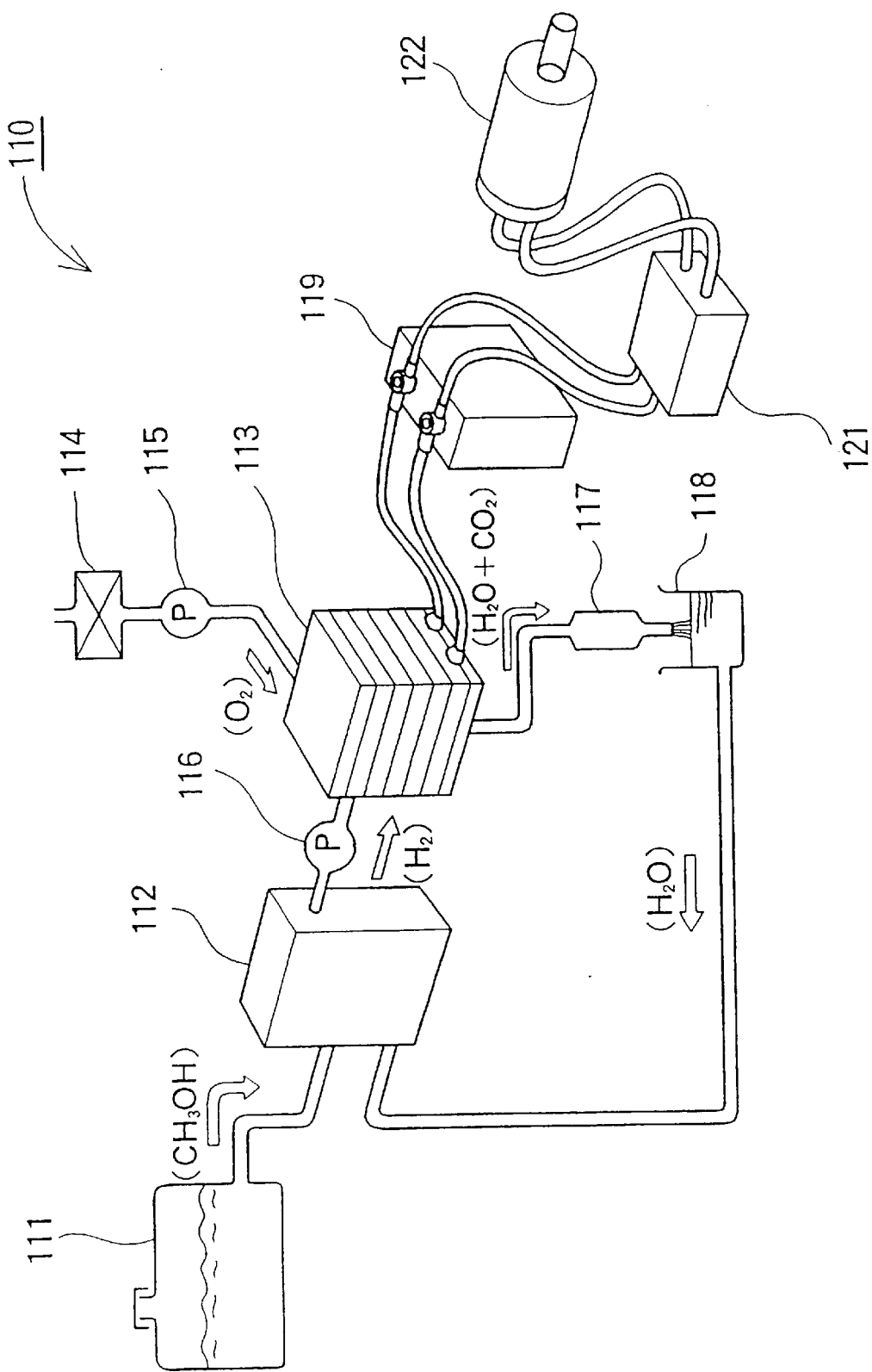
FIG. 7 is a block diagram showing a fuel cell system by way of example.

FIG. 5 is a view illustrative of a second mode of operation of the fuel-cell-powered four-wheel automobile according to the present invention, and shows an operation flow of the power system 30. In the power system 30, methanol ($CH_3OH$) and water ($H_2O$) are delivered from the tank 41 to the reforming unit 42 as indicated by the arrow ①, and the reforming unit 42 generates hydrogen ($H_2$). The hydrogen ($H_2$) generated by the reforming unit 42 is delivered to the fuel cell 43 as indicated by the arrow ②, and oxygen ($O_2$) in the atmosphere is supplied to the fuel cell 43 as indicated by the arrow ③, causing the fuel cell 43 to generate electricity.

Water vapor ($HO_2$) generated from the fuel cell 43 and carbon dioxide ($CO_2$) generated by the reforming unit 42 and delivered via the fuel cell 43 are discharged, and exhaust gases including the carbon dioxide ($CO_2$) are reduced by a catalyst (not shown). Thereafter, the exhaust gases are discharged from the exhaust pipe 35 into the atmosphere as indicated by the arrow ④. The gases generated from the fuel cell 43 or the reforming unit 42 may contain a small amount of carbon monoxide and hydrocarbon. These gases are also reduced by the catalyst. A flow of electricity will be described below.

The electricity generated by the fuel cell 43 is supplied to the electric motor 51 as indicated by the arrow ⑤, and stored in the secondary battery 44 as indicated by the arrow ⑥. The electricity is supplied from the secondary battery 44 to the electric motor 51 as indicated by the arrow ⑦. The power system 30 has the fuel cell 43 and the electric motor 51 that are disposed respectively on the left and right sides or the right and left sides of a central line C which divides the chassis (see FIG. 1) into left and right portions.

In the fuel-cell-powered four-wheel automobile 10 (see FIG. 1), it is important to keep the weight of the chassis 11 in balance. The weight of the chassis 11 is kept in good balance by positioning the fuel cell 43 and the electric motor 51 respectively on the left and right sides or the right and left sides of the central line C which divides the chassis 11 into the left and right portions.

In the above embodiment, the fuel-cell-powered four-wheel automobile 10 has been described as a buggy as shown in FIG. 1. However, the fuel-cell-powered four-wheel automobile 10 is not limited to a buggy, but may be any four-wheel automobile with a fuel cell mounted thereon.

The present invention thus arranged as described above offers several effects. A tank is disposed beneath the floor for storing methanol and water, a reforming unit is disposed beneath the floor for generating hydrogen from methanol and water supplied from the tank, a fuel cell is disposed beneath the floor for generating electricity from an electrochemical reaction of hydrogen generated by the reforming unit and oxygen in air, and a secondary battery is disposed beneath the floor for storing electricity generated by the fuel cell. Therefore, mechanisms for generating electricity from air, methanol, and water are centralized. As a result, a function to generate electricity from air, methanol, and water can be accommodated in one unit, and the components including the tank, the reforming unit, the fuel cell, and the secondary battery can be made compact.

The fuel cell and the electric motor are disposed respectively on the left and right sides or the right and left sides of a central line which divides the chassis into left and right portions. Therefore, the weight of the chassis is kept in good balance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel-cell-powered four-wheel automobile having a chassis which is of a rectangular shape as viewed in plan with four wheels positioned at respective four corners thereof, a riding seat disposed substantially centrally on the chassis, a flat floor mounted on said chassis in front of the riding seat, and an electric motor for moving the four-wheel automobile, wherein a tank is disposed beneath said floor for storing material for a fuel cell, wherein said fuel cell is disposed beneath said floor for generating electricity from an electrochemical reaction of hydrogen and oxygen in air, and a secondary battery is disposed beneath said floor for storing electricity generated by the fuel cell, wherein said fuel cell is disposed entirely on one side of a central line which divides the chassis into left and right portions, and said electric motor is disposed entirely on an opposite side of said central line.

2. A fuel-cell-powered four-wheel vehicle, comprising:

a substantially rectangular chassis;

four wheels positioned at respective four corners of said chassis;

a riding seat disposed substantially centrally on said chassis;

a substantially flat floor mounted on said chassis in front of said riding seat;

an electric motor for moving the four-wheel vehicle;

a fuel cell disposed beneath said floor for generating electricity from an electrochemical reaction of hydrogen and oxygen in air; and a tank disposed beneath said floor for storing material for said fuel cell; and a secondary battery disposed beneath said floor for storing electricity generated by said fuel cell, wherein said fuel cell is disposed entirely on one side of a central line which divides the chassis into left and right portions, and said electric motor is disposed entirely on an opposite side of said central line.

3. The fuel-cell-powered four-wheel vehicle according to claim 2, further comprising a case which houses said tank, said reforming unit, and said fuel cell therein.

4. The fuel-cell-powered four-wheel vehicle according to claim 3, wherein said case further houses said secondary battery therein.

5. The fuel-cell-powered four-wheel vehicle according to claim 3, wherein said case has an opening therein, and said floor comprises a cover which closes said opening.

6. The fuel-cell-powered four-wheel vehicle according to claim 5, wherein said floor has stiffener ribs therein.

7. The fuel-cell-powered four-wheel vehicle according to claim 3, further comprising an air cleaner located remotely from said case.

8. The fuel-cell-powered four-wheel vehicle according to claim 7, further comprising an air pipe interconnected between said air cleaner and said case.

9. The fuel-cell-powered four-wheel vehicle according to claim 8, wherein said air pipe includes an air pump therein.

10. A vehicle, comprising:
   a chassis having a floor;
   a plurality of wheels supporting said chassis;
   a case located below said floor;
   a fuel cell disposed in said case for generating electricity from an electrochemical reaction of hydrogen and oxygen in air; and
   a tank disposed in said case for storing material for said fuel cell; and
   a secondary battery disposed in said case for storing electricity generated by said fuel cell,
   wherein said fuel cell is disposed entirely on one side of a central line which divides the chassis into left and right portions, and said electric motor is disposed entirely on an opposite side of said central line.

11. The vehicle according to claim 10, wherein said case has an opening therein, and said floor comprises a cover which closes said opening.

12. The vehicle according to claim 11, wherein said floor has stiffener ribs therein.

13. The vehicle according to claim 10, further comprising an air cleaner located remotely from said case.

14. The vehicle according to claim 13, further comprising an air pipe interconnected between said air cleaner and said case.

15. The vehicle according to claim 14, wherein said air pipe includes an air pump therein.

16. The vehicle according to claim 10, further comprising:
   a riding seat disposed substantially centrally on said chassis and rearwardly of said floor; and
   an electric motor located rearwardly of said seat for driving the vehicle.

17. The vehicle according to claim 16, further comprising:
   an air cleaner located remotely from said case;
   an air pipe interconnected between said air cleaner and said case; and
   an air pump located in said air pipe.

* * * * *